United States Patent [19]

Sawhill

[11] Patent Number: 4,849,380

[45] Date of Patent: Jul. 18, 1989

[54] DIELECTRIC COMPOSITION

[75] Inventor: Howard T. Sawhill, West Chester, Pa.

[73] Assignee: E. I. Du Pont De Nemours and Company, Wilmington, Del.

[21] Appl. No.: 149,506

[22] Filed: Jan. 28, 1988

[51] Int. Cl.$^4$ .............................................. C03C 08/16
[52] U.S. Cl. ...................................... 501/20; 501/17; 501/32; 501/66; 524/444; 524/560
[58] Field of Search ...................... 501/17, 20, 32, 66; 524/444, 560

[56] References Cited

U.S. PATENT DOCUMENTS

| | | | |
|---|---|---|---|
| 4,591,758 | 5/1986 | Barth et al. | 501/20 |
| 4,624,934 | 11/1986 | Kokubu et al. | 501/17 |
| 4,749,665 | 6/1988 | Yano et al. | 501/17 |

Primary Examiner—William R. Dixon, Jr.
Assistant Examiner—Anthony J. Green

[57] ABSTRACT

A composition for making low K dielectric layers which is an admixture of finely divided solids consisting essentially of (a) lead-free amorphous borosilicate glass containing $Al_2O_3$, a mixture of oxides of alkali metals, alkaline earth metals or mixtures thereof containing $Li_2O$, and (b) a ceramic filler selected from mullite, mixtures of mullite with fused silica and mixtures of quartz with fused silica.

7 Claims, No Drawings

DIELECTRIC COMPOSITION

FIELD OF INVENTION

The invention relates to improved dielectric green tape compositions, particularly those having a low dielectric constant.

BACKGROUND OF THE INVENTION

Recent advances in silicon chip technology have increased the need for multilayer interconnect systems to provide higher density circuits, faster signal propagation and to allow direct silicon die attachment. To meet these new requirements, the dielectric material must have a low dielectric constant (preferably less than 5) to reduce signal propagation delay, and it must have a thermal expansion coefficient close to the value for silicon (3.5 ppm/°C.) to allow direct die attachment to the substrate.

Heretofore, most of the dielectric materials used in multilayer circuits have been conventional thick film compositions. A typical circuit is constructed by sequentially printing, drying and firing functional thick film layers atop a ceramic substrate which is usually 92-96% wt. $Al_2O_3$). The multiple steps required make this technology process intensive with the large number of process steps and yield losses attributing to high costs. Thick film technology nevertheless fills an important need in microelectronics and will continue to do so in the foreseeable future. Recently, dielectric thick film compositions with low dielectric constant have been introduced. However, ceramic substrates with thermal expansion coefficients equal to that of silicon (3.5 ppm/°C.) are not readily available.

High temperature co-fired (HTCF) technology has been used to fabricate multilayer circuits and offers processing advantages over thick film. This tape process involves lamination of a number of thin sheets of ceramic dielectric material (usually $Al_2O_3$) interspersed with alternating printed layers of conductive material. However, co-firing alumina with metallization requires a 1600° C. reducing environments with refractory metals such as molybdenum or tungsten, both of which have poor conductivity relative to metals available for use below 1000° C.

Low temperature co-fired (LTCF) technology has been recently introduced as a method for fabricating multilayer circuits. This technology offers the combination of the processing advantages of HTCF technology and the materials advantages of thick film technology. These LTCF tape systems have firing temperatures below 1000° C. and allow the use of high conductivity metals such as silver, gold, platinum and copper. (Copper, however, requires reducing atmospheres.) Most of these tape systems have dielectric constants between 6 and 8 and encompass a range of thermal coefficient of expansion (TCE). Currently, there is no readily available low temperature co-fired dielectric tape system that offers both low dielectric constant (less than 5) and a TCE matched to silicon (3.5 ppm/°C.).

From the foregoing, it can be seen that there is a substantial need for a low temperature co-fireable tape dielectric which (1) has a low dielectric constant (less than 5), (2) has a thermal expansion coefficient very close to the value for silicon (3.5 ppm/°C.), and (3) can be fired in air at a low temperature (less than 1000° C.), thus permitting the use of high conductivity metallurgies such as gold, silver and silver/palladium.

SUMMARY OF THE INVENTION

In its primary aspect, the invention is directed to a composition for making low K dielectric layers which is an admixture of finely divided solids consisting essentially of:

(a) 55-75% wt. lead-free amorphous borosilicate glass in which the weight ratio of $B_2O_3$ to $SiO_2$ is 0.22-0.55 containing 0.5-1.5% wt. $Al_2O_3$, 1.5-4.0% wt. of a mixture of oxides of alkali metals, alkaline earth metals or mixtures thereof, which oxide mixture contains 0.3-1.0% wt. $Li_2O$, basis total glass; and (b) 45-25% wt. of a ceramic filler selected from mullite, mixtures of mullite with fused silica and mixtures of quartz and fused silica.

In a second aspect, the invention is directed to a tape-casting composition comprising the above-described composition dispered in a solution of polymeric binder in volatile organic solvent.

DETAILED DESCRIPTION OF THE INVENTION

A. Glass Composition

The glass compositions which can be used in the invention are amorphous borosilicate glasses containing 0.5-1.5% wt. $Al_2O_3$ and 1.5-4.0% wt. alkali metal oxides and/or alkaline earth metal oxides. The borosilicate component of the glass must be within the range of 94.5-98.3% wt. of the glass. If less than 94.5% wt. borosilicate is used, the glass becomes too electroconductive and the dissipation factor (DF) becomes too high. On the other hand, if the borosilicate content is higher than 98.3% wt., the sintering temperature of the glass exceeds practical firing temperatures. The weight ratio of $B_2O_3$ to $SiO_2$ should be within the range of 0.22 to 0.55 and preferably 0.25 to 0.40. It is preferred that the glass be capable of viscous phase sintering at 850°-950° C. A particularly preferred glass composition has the composition by weight 72% $SiO_2$, 25% $B_2O_3$, 1% $Al_2O_3$, 1% $K_2O$, 0.5% $Na_2O$ and 0.5% $Li_2O$.

A small amount of alumina is needed in the glass to reduce dissolution of the ceramic fillers into the glass when it is fired. At least 0.5% wt. alumina is needed for this purpose. However, if more than 1.5% wt. is used, the viscosity of the glass becomes excessive and wetting and sintering properties are affected adversely. In addition, it is required to have from 1.5 to 4.0% wt. oxides of alkali and/or alkaline earth metals or mixtures thereof which contain 0.3 to 1.0% wt. $Li_2O$. At least 1.5% wt. of such metal oxides are needed to obtain the proper low viscosity of the glass during firing. However, if more than 4.0% wt. is used, the conductivity of the sintered composition is likely to be too high. In order to minimize the amount of alkaline ions in the glass, it is preferred that the glass contain 0.3-1.0% wt. $Li_2O$ by which the lowest useful sintering viscosity can be obtained with the least amount of alkaline ions, i.e., alkali, metal and alkaline metal earth ions. In addition, the amount of other alkali metal oxides ($Na_2O$, $K_2O$) should be kept below 3.0% wt. basis total glass. The above-described glasses should contain essentially no Bi, Pb or other large polarizable ions which adversely affect the dielectric constant.

The glasses can be prepared by conventional glass-making techniques by mixing the desired components in the desired proportions and heating the mixture to form melt. As is well known in the art, heating is conducted to a peak temperature and for a time such that the melt becomes entirely liquid and homogeneous. In the present work, the components are premixed by shaking in a polyethylene jar with plastic balls and then melted in a platinum crucible at the desired temperature. The melt is heated at the peak temperature for a period of 1 to 1½ hours. The melt is then quenched. The crude frit is then jet milled to a maximum particle size of less than or equal to 15 microns.

After discharging the milled-frit slurry from the mill, excess solvent is removed by decantation and the frit powder is air dried at room temperature. The dried powder is then screened through a 325-mesh screen to remove any large particles.

B. Ceramic Filler

The fillers for use in the invention have been chosen because they have dielectric constants (K) which are close to the K value of the matrix glass with which they are used. This closeness in K value of the glass and the filler is believed to minimize the dispersion of electrical signals at high frequency.

Suitable fillers meeting the above-described criterion are mullite ($3Al_2O_3.2SiO_2$), mixtures of mullite with fused silica, and mixtures of quartz and fused silica. A minor amount of $Al_2O_3$ on the order of 0.5-2.0% wt. can be added to the mixture of quartz and fused silica to control filler dissolution rates. These materials are used in such proportions that the fired compositions made therefrom have a temperature coefficient of expansion (TCE) which approximates the TCE of silicon metal.

These fillers also serve the quite important function of adding a skeletal structure which provides shape preservation during firing of the dielectric composition. Without these fillers, the glass dielectric would slump and therefor change shape.

The fillers used in the composition of the invention do not undergo sintering at the normal firing conditions of 850°-950° C. However, the fillers do appear to undergo limited dissolution into the sintered glass. In the ordinary use of the compositions of the invention, typical firing cycles are 20-25 minutes to peak temperature, 10 minutes at peak temperature and 25-30 cooldown time.

The particle size of the solids of the invention is not critical as to dielectric constant values so long as it does result in a porous structure. However, it is important that the average particle size be from 1-15 microns and preferably 2-10 microns in order to obtain good green (unfired) density and to control shrinkage upon firing.

C. Preparation of Green Tape

The compositions of the invention can be easily used for the manufacture of green tape by the conventional method of slip casting a slurry of the dielectric particles dispersed in a solution of binder polymer, plasticizer and volatile solvent onto a flexible carrier such as polypropylene or Mylar ® polyester film or stainless steel, adjusting the thickness of the cast film by passing the cast slurry under a doctor blade and then heating the doctored slurry to remove the volatile solvent from the layer by evaporation. The solid layer of solids dispersed in a matrix of polymeric binder is removed from the carrier and slit to appropriate widths for use in making multilayer structures. Green tapes of this kind generally have a thickness of 3 to 15 mils.

A wide variety of polymeric materials can be used as the binder for green tape such as poly (vinyl butyral), poly (vinyl acetate), poly (vinyl alcohol), cellulosic polymers such as methyl cellulose, ethyl cellulose, hydroxy ethyl cellulose, methylhydroxy ethyl cellulose, atactic polypropylene, polyethylene, silicon polymers such as poly (methyl siloxane), poly (methyl phenyl siloxane), polystyrene, butadiene/styrene copolymer, polystyrene, poly (vinyl pyrrolidone), polyamides, high molecular weight polyethers, copolymers of ethylene oxide and propylene oxide, polyacrylamides, and various acrylic polymers such as sodium polyacrylate, poly (lower alkyl acrylates), poly (lower alkyl methacrylates) and various copolymers and multipolymers of lower alkyl acrylates and methacrylates. Copolymers of ethyl methacrylate and methyl acrylate and terpolymers of ethyl acrylate, methyl methacrylate and methacrylic acid.

A preferred class of polymeric binders for making green tapes for the composition of the invention are those disclosed by Usala in U.S. Pat. No. 4,613,648. These polymeric binders are a mixture of compatible multipolymers of 0-100% wt. $C_{1-8}$ alkyl methacrylate, 100-0% wt. $C_{1-8}$ alkyl acrylate and 0-5% wt. ethylenically unsaturated carboxylic acid or amine, the multipolymer being further characterized as having a number average molecular weight ($M_n$) of 50,000 to 100,000, a weight average molecular weight ($M_w$) of 150,000 to 350,000, the ratio of $M_w$ to $M_n$ being no greater than 5.5, the total amount of unsaturated carboxylic acid or amine in the multipolymer mixture is 0.2-2.0% wt., and the glass transition temperature of the polymer and plasticizer therein, if any, is −30° to +45° C.

The organic medium in which the ceramic solids are dispersed contains principally the polymeric binder dissolved in organic solvent. However, the medium may contain other dissolved materials such as plasticizers, release agents, dispersing agents, thixotropic agents, stripping agents, antifouling agents and wetting agents.

It will be recognized that by adjusting the rheological properties of the dispersions of the invention and by changing the solvent component of the organic medium, the invention compositions can be applied to substrates by other methods than casting, e.g., by screen printing. When the compositions are applied by screen printing, the conventional organic media materials used for thick film materials can be used so long as the acrylic polymers are completely soluble therein at application temperatures.

For casting solutions, the solvent component of the organic medium is chosen so as to obtain complete solution therein of the polymer and sufficiently high volatility to enable the solvent to be evaporated from the dispersion by the application of relatively low levels of heat at atmospheric pressure. In addition, the solvent must boil well below the boiling point and decomposition temperature of any other additives contained in the organic medium. Thus, solvents having atmospheric boiling points below 150° C. are used most frequently. Such solvents include benzene, acetone, xylene, methanol, ethanol, methyl ethyl ketone, 1,1,1-trichloroethane, tetrachloroethylene, amyl acetate, 2,2 4-triethylpentanediol-1,3-monoisobutyrate, toluene, methylene chloride, 2-propanol and Freon ® TF (trichlorotrifluoroethane).

D. Multilayer Applications

In their use for the manufacture of multilayer structures, the compositions of the invention can be used with noble metals and with most base metal conductors other than copper. However, copper can also be used with the compositions of the invention if the composition is modified to provide oxygen-releasing compounds to facilitate burnout of organics. Such compounds include materials such as $Co_3O_4$ and $MnO_2$. Thus they may be used with Ni, Au, Ag, Pd/Ag and Pt/Ag. Conductors of unalloyed silver metal can be used, but are not preferred because of the tendency of the silver metal to migrate into the dielectric layer upon firing. Unlike many such dielectric compositions, those of the invention may be fired in either oxidizing atmospheres such as air or in non-oxidizing atmospheres such as nitrogen. The choice of firing atmosphere will usually be dictated by the oxidation stability of the conductive metal under firing conditions.

E. Formulation of Examples

Casting solutions were formulated by dispersing the below-listed inorganic solids in solvent/polymer blends in a high speed dispersion mixer, a Waring blender. The dispersions were achieved by mixing for 10 minutes using the highest setting on the blender. The viscosity of solutions was measured on a Brookfield RVT viscometer using a spindle No. 5 at 20 rpm. Viscosities of the casting solutions for Examples 1 to 11 ranged from 0.9 to 4.5 PaS. The solutions were formed into a green tape by casting onto a silicone-coated Mylar ® polyester film at 60° C. The thickness of the cast tapes for Examples 1 to 11 varied between 4.1 and 4.7 mils. Sheets of tape 3 in.×3 in. (7.6 cm×7.6 cm) were cut from the cast tape. Samples were fabricated into a substrate geometry by laminating eight sheets together by means of a confined pressing die operated for 10 minutes at 70° C. and 3 kpsi. Laminates were cut into oversized 2 in.×2 in. (5.0 cm.×5.0 cm.) squares to remove the registration holes at the corners of the 3×3 in. sheets used for alignment during lamination. Laminates were heated at 350° C. for 60 min. to effect organics removal and then fired at a peak temperature of 850° C. for 15 min. in air during a firing and cooling cycle of 70 min. Fired samples were measured for density by dividing the fired weight by the product of the fired dimensions (W×D×t). The glass used in the following examples corresponded to the preferred glass composition described hereinabove.

EXAMPLES

Examples 1 to 4

Densification Study - Volume Loading at Fixed TCE Value (3.5 ppm/°C.)

Casting solutions were formulated with systematic variations in the volume ratio of glass to ceramic fillers in such a way that the TCE of the composite remained unchanged and equal to 3.5 ppm/°C. These examples show that the upper limitations of filler volume loading in this system is approximately equal to 35 vol. %. Above this value, full densification is not achieved during the firing schedule and residual porosity remains.

TABLE I

DENSIFICATION STUDY
VOLUME LOADING AT FIXED TCE

| | Example No. | | | |
|---|---|---|---|---|
| | 1 | 2 | 3 | 4 |
| Solids Composition % Vol. | | | | |
| Glass | 80.00 | 65.00 | 63.00 | 50.00 |
| Mullite | 20.00 | 30.00 | 31.00 | 40.00 |
| Fused Silica | 0.00 | 5.00 | 6.00 | 10.00 |
| Total Filler | 20.00 | 35.00 | 37.00 | 50.00 |
| Total Composition % Wt. | | | | |
| Glass | 45.23 | 36.28 | 30.09 | 27.54 |
| Mullite | 14.87 | 22.01 | 19.47 | 28.96 |
| Fused Silica | 0.00 | 2.88 | 2.96 | 5.69 |
| Polymer Total | 5.45 | 5.55 | 4.03 | 5.64 |
| MEK Total | 3.64 | 3.70 | 2.69 | 3.76 |
| Trichloroethane | 24.40 | 23.06 | 36.02 | 21.76 |
| Dioctyl Phthalate | 1.37 | 1.39 | 1.01 | 1.41 |
| Isopropanol | 1.29 | 1.31 | 0.95 | 1.33 |
| Methylene Chloride | 1.50 | 1.53 | 1.11 | 1.56 |
| Freon ® TF* | 2.25 | 2.29 | 1.67 | 2.33 |
| Total | 100.00 | 100.00 | 100.00 | 100.00 |
| Properties | | | | |
| Fired Density (% Theoretical) | 103 | 99 | 91 | 85 |

*Freon ® is a trademark of E. I. du Pont de Nemours & Co., Wilmington, DE for fluorinated solvents.

Examples 5 to 7

Densification Study - Ratio of Fillers with Filler Volume Fixed at 32%

Casting solutions were made with systematic variations in the ratio of the two ceramic fillers in such a way that the total volume percent of fillers remained unchanged and equal to 32%. The TCE values of these samples ranged between 2.9 and 3.6 ppm/°C. These examples demonstrate the flexibility of the systems to achieve a useful range of different composite TCEs.

TABLE 2

DENSIFICATION STUDY
RATIO OF FILLERS AT FIXED (32%) VOLUME OF FILLERS

| | Example No. | | |
|---|---|---|---|
| | 5 | 6 | 7 |
| Solids Composition % Vol. | | | |
| Glass | 68.00 | 68.00 | 68.00 |
| Mullite | 32.00 | 26.80 | 16.43 |
| Fused Silica | 0.00 | 5.20 | 15.57 |
| Total Filler | 32.00 | 32.00 | 32.00 |
| Total Composition % Wt. | | | |
| Glass | 35.16 | 35.36 | 35.77 |
| Mullite | 21.75 | 18.32 | 11.36 |
| Fused Silica | 0.00 | 2.79 | 8.46 |
| Polymer Total | 4.37 | 4.34 | 4.27 |
| MEK Total | 2.91 | 2.89 | 2.85 |
| Trichloroethane | 30.68 | 31.21 | 32.28 |
| Dioctyl Phthalate | 1.09 | 1.09 | 1.07 |
| Isopropanol | 1.03 | 1.02 | 1.01 |
| Methylene Chloride | 1.20 | 1.19 | 1.18 |
| Freon ® TF | 1.80 | 1.79 | 1.76 |
| Total | 100.00 | 100.00 | 100.00 |
| Properties | | | |
| Fired Density (% Theoretical) | 101 | 101 | 101 |
| TCE, ppm/°C. | 3.62 | 3.41 | 2.99 |

Examples 8 to 10

Densification Study - Ratio of Fillers with Fixed (37%) Filler Volume

Casting solutions were made with systematic variations in the ratio of the two ceramic fillers in such a way that the total volume percent of fillers remained unchanged and was equal to 37%. The TCE values of these samples ranged between 2.9 and 3.6 as did Examples 5 to 7. However, the larger volume loadings led to a wide variation in fired densities for these samples. These examples demonstrate the existence of an upper limit (of approximately 35 vol. %) beyond which densification is incomplete and residual porosity remains in the fired samples. This upper limit will likely vary with changes in particle sizes of the glass and ceramic components and also with the addition of wetting surfactants that affect the wetting behavior of the glass on the ceramic fillers.

TABLE 3

DENSIFICATION STUDY
RATIO OF FILLERS AT FIXED (37%) FILLERS

| | Example No. | | |
|---|---|---|---|
| | 8 | 9 | 10 |
| Solids Composition % Vol. | | | |
| Glass | 63.00 | 63.00 | 63.00 |
| Mullite | 37.00 | 31.00 | 19.00 |
| Fused Silica | 0.00 | 6.00 | 18.00 |
| Total Filler | 37.00 | 37.00 | 37.00 |
| Total Composition % Wt. | | | |
| Glass | 29.91 | 30.09 | 30.46 |
| Mullite | 23.09 | 19.47 | 12.08 |
| Fused Silica | 0.00 | 2.96 | 8.99 |
| Polymer Total | 4.07 | 4.03 | 3.96 |
| MEK Total | 2.71 | 2.69 | 2.64 |
| Trichloroethane | 35.44 | 36.02 | 37.23 |
| Dioctyl Phthalate | 1.02 | 1.01 | 0.99 |
| Isopropanol | 0.96 | 0.95 | 0.93 |
| Methylene Chloride | 1.12 | 1.11 | 1.09 |
| Freon ® TF | 1.68 | 1.67 | 1.63 |
| Total | 100.00 | 100.00 | 100.00 |
| Properties | | | |
| Fired Density (% Theoretical) | 88 | 91 | 98 |
| TCE, ppm/°C. | 3.68 | 3.44 | 2.96 |

Example 11

Preferred Composition

The following composition results in a slip which when cast results in a green tape with excellent mechanical properties and when fired results in a fully dense ceramic having a dielectric constant below 5 and TCE near to that for silicon (3.5 ppm/°C.).

| Composition | |
|---|---|
| Ceramic/Binder Ratio (wt.) | 7 |
| Binder/Plasticizer Ratio (wt.) | 6 |
| Glass | 68 |
| Mullite | 28 |
| Fused Silica | 4 |
| Glass | 30.43 |
| Mullite | 16.47 |
| Fused Silica | 1.85 |
| Polymer Total | 0.95 |
| MEK Total | 4.64 |
| Trichloroethane | 34.22 |
| Dioctyl Phthalate | 1.16 |
| Isopropanol | 1.09 |
| Methylene Chloride | 1.28 |
| Freon ® TF | 1.91 |
| | 100.00 |
| Properties | |
| Measured Density, g/cc | 2.32 |
| Theoretical Density, g/cc | 2.32 |
| TCE (ppm/°C.) | 3.50 |
| Dielectric Constant at 1 MHz | 4.70 |
| Linear Shrinkage, % | 16.0 |

I claim:

1. A composition for making low K dielectric layers which is an admixture of finely divided solids consisting essentially of:
   (a) 55–75% wt. lead-free amorphous borosilicate glass in which the weight ratio of $B_2O_3$ to $SiO_2$ is 0.22–0.55 containing 0.5–1.5% wt. $Al_2O_3$, 1.5–4.0% wt. of a mixture of oxides of alkali metals, alkaline earth metals or mixtures thereof, which oxide mixture contains 0.3–1.0% wt. $Li_2O$, basis total glass; and
   (b) 45–25% wt. of a ceramic filler selected from mullite, mixtures of mullite with fused silica and mixtures of quartz and fused silica.

2. The composition of claim 1 in which the borosilicate glass contains 0.9–3.0% wt. mixed $Na_2O$ and $K_2O$.

3. The composition of claim 1 in which the borosilicate component of the glass consists essentially of 72% wt. $SiO_2$ and 28% wt. $B_2O_3$.

4. A tape casting composition comprising the composition of claim 1 dispersed in a solution of polymeric binder dissolved in volatile organic solvent.

5. The tape casting composition of claim 4 in which the binder component is selected from polymers of methyl methacrylate, ethyl methacrylate, methyl acrylate and mixtures thereof.

6. The tape casting composition of claim 4 which also has dissolved therein a plasticizer for the polymeric binder.

7. A ceramic green tape prepared by casting a thin layer of the composition of claim 4 on a flexible substrate, heating the cast layer to remove volatile solvent therefrom and removing the solvent-free layer from the substrate.

* * * * *